United States Patent
Wang et al.

(10) Patent No.: US 9,806,506 B2
(45) Date of Patent: Oct. 31, 2017

(54) HIGH VOLTAGE EQUIPMENT BOX FOR RAILWAY VEHICLE

(71) Applicant: CRRC QINGDAO SIFANG CO., LTD., Qingdao, Shandong (CN)

(72) Inventors: Hongbo Wang, Shandong (CN); Yongzhen Qin, Shandong (CN); Lin Tao, Shandong (CN); Xiankai Zhang, Shandong (CN); Yongming Zhang, Shandong (CN); Jinghai Jiao, Shandong (CN); Guangwei Xu, Shandong (CN); Buzhao Niu, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/511,832

(22) PCT Filed: Nov. 16, 2015

(86) PCT No.: PCT/CN2015/094665
§ 371 (c)(1),
(2) Date: Mar. 16, 2017

(87) PCT Pub. No.: WO2016/176978
PCT Pub. Date: Nov. 10, 2016

(65) Prior Publication Data
US 2017/0288379 A1    Oct. 5, 2017

(30) Foreign Application Priority Data

May 6, 2015  (CN) .......................... 2015 1 0226341
May 6, 2015  (CN) .......................... 2015 1 0227070

(Continued)

(51) Int. Cl.
*H02G 3/08* (2006.01)
*B61D 49/00* (2006.01)
*H02G 3/04* (2006.01)

(52) U.S. Cl.
CPC ............. *H02G 3/081* (2013.01); *B61D 49/00* (2013.01); *H02G 3/0456* (2013.01)

(58) Field of Classification Search
CPC .................................................. H01L 2224/16
(Continued)

(56) References Cited

FOREIGN PATENT DOCUMENTS

| CN | 203374101 U | 1/2014 |
|---|---|---|
| CN | 203760855 U | 8/2014 |

(Continued)

OTHER PUBLICATIONS

Standardization Administration of the People's Republic of China, SAC & General Administration of Quality Supervision, Inspection and Quarantine of the People's Republic of China (AQSIQ) , Railway applications—Electric equipment for rolling stock—Part 1 General service conditions and general rules, Jan. 22, 2008(Jan. 22, 2008), pp. 1-34.

(Continued)

*Primary Examiner* — Timothy Thompson
*Assistant Examiner* — Stanley Tso
(74) *Attorney, Agent, or Firm* — Yue Xu; U.S. Fairsky LLP

(57) ABSTRACT

A high voltage equipment box for a rail vehicle includes a box body and electric equipment arranged in the box body, two ends of the box body in a width direction of the vehicle extend to respective skirt plates, and an avoidance gap is provided at a bottom of each of the two ends of the box body, a bottom of each of the skirt plates is fixed at the respective avoidance gap, a top of the box body extends to a position above a bottom beam of a vehicle body, and a bottom of the (Continued)

box body is flush with a bottom plate of the vehicle body and forms a part of the bottom plate of the vehicle body.

17 Claims, 11 Drawing Sheets

(30) Foreign Application Priority Data

| May 6, 2015 | (CN) | 2015 2 0287745 U |
|---|---|---|
| May 6, 2015 | (CN) | 2015 2 0288403 U |
| May 6, 2015 | (CN) | 2015 2 0288404 U |
| May 6, 2016 | (CN) | 2015 1 0227436 |

(58) Field of Classification Search
USPC ............................................... 174/520
See application file for complete search history.

(56) References Cited

FOREIGN PATENT DOCUMENTS

| CN | 104779535 A | 7/2015 |
|---|---|---|
| CN | 104787061 A | 7/2015 |
| CN | 104787062 A | 7/2015 |
| CN | 204605793 U | 9/2015 |
| CN | 204615191 U | 9/2015 |
| CN | 204615192 U | 9/2015 |
| CN | 204615193 U | 9/2015 |
| CN | 204641749 U | 9/2015 |
| JP | H09219904 A | 8/1997 |
| JP | 4246939 B2 | 4/2009 |
| JP | 4715456 B2 | 7/2011 |

OTHER PUBLICATIONS

International Search Report for PCT/CN2015/094665, dated Feb. 29, 2016, ISA/CN.

HIGH VOLTAGE EQUIPMENT BOX FOR RAILWAY VEHICLE

This application is the national phase of International Application No. PCT/CN2015/094665, titled "HIGH VOLTAGE EQUIPMENT BOX FOR RAILWAY VEHICLE", filed on Nov. 16, 2015, which claims the benefit of priorities to Chinese patent application No. 201510227070.5, titled "HIGH VOLTAGE EQUIPMENT BOX FOR RAILWAY VEHICLE", filed with the Chinese State Intellectual Property Office on May 6, 2015, and Chinese patent application No. 201520287745.0, titled "HIGH VOLTAGE EQUIPMENT BOX FOR RAILWAY VEHICLE", filed with the Chinese State Intellectual Property Office on May 6, 2015, and Chinese patent application No. 201510226341.5 titled "HIGH VOLTAGE EQUIPMENT BOX FOR RAILWAY PASSENGER VEHICLE", filed with the Chinese State Intellectual Property Office on May 6, 2015, and Chinese patent application No. 201520288403.0, titled "HIGH VOLTAGE EQUIPMENT BOX FOR RAILWAY PASSENGER VEHICLE", filed with the Chinese State Intellectual Property Office on May 6, 2015, and Chinese patent application No. 201510227436.9, titled "HIGH VOLTAGE EQUIPMENT BOX FOR RAIL VEHICLE", filed with the Chinese State Intellectual Property Office on May 6, 2015, and Chinese patent application No. 201520288404.5, titled "HIGH VOLTAGE EQUIPMENT BOX FOR RAIL VEHICLE", filed with the Chinese State Intellectual Property Office on May 6, 2015, the entire disclosures of which are incorporated herein by reference.

FIELD

The present application relates to an equipment box, and particularly to a high voltage equipment box for rail vehicles.

BACKGROUND

High-speed rail vehicles are generally provided with a high voltage equipment box, high voltage of 25 KV coming from a pantograph passes through a vacuum circuit breaker in the high voltage equipment box and then enters into a traction transformer. Currently, the minimum clearance for equipments in the high voltage equipment box, such as the vacuum circuit breaker, is about 230 mm, which only meets the requirement of overvoltage level OV3 (GB/T21413.1), and does not meet the requirement of overvoltage level OV4 (GB/T21413.1).

For vehicles running at high altitudes, due to decreased air pressure or air density, the external insulation strength of the vehicles is reduced accordingly, and the external insulation withstand voltages of the electric components need to be modified, and the clearance for electric equipments is required to be increased accordingly. Also, high altitude regions has relatively fierce sand wind and low temperature, the vehicles running at high altitudes are further required to have capabilities of withstanding wind pressure and low temperature.

SUMMARY

A main object of the present application is to address the above technical issues and deficiencies, to provide a high voltage equipment box for rail vehicles which meets requirements for high altitude operation.

To achieve the above objects, technical solutions of the present application are as follows.

A high voltage equipment box for a rail vehicle includes a box body and electric equipment arranged in the box body, wherein two ends of the box body in a width direction of the vehicle extend to respective skirt plates, and an avoidance gap is provided at a bottom of each of the two ends of the box body, a bottom of each of the skirt plates is fixed at the respective avoidance gap, a top of the box body extends to a position above a bottom beam of a vehicle body, and a bottom of the box body is flush with a bottom plate of the vehicle body and forms a part of the bottom plate of the vehicle body.

Further, the box body includes a main framework, and the main framework includes a bottom frame and two end frames arranged at two ends of the bottom frame respectively, and the bottom frame is fixed to each of the end frames by a respective connecting frame obliquely arranged.

Further, a skirt plate mounting base is provided at a position where the connecting frame is located, the skirt plate mounting base is in an L shape, and the L-shaped skirt plate mounting base has one end connected to a bottom of the respective end frame and another end connected to the bottom frame, and a bottom of the skirt plate is fixed to the skirt plate mounting base.

Further, two sides of the box body in a length direction of the vehicle are flush with two bottom beam of the vehicle body which are adjacent to the box body.

Further, the box body is provided with a hanger, the hanger is arranged in the length direction of the vehicle and extends through the two sides of the box body, two ends of the hanger extend downward and are respectively provided with connecting blocks protruding outwards, one lateral surface of each of the connecting blocks fits closely against a bottom surface of the respective bottom beam of the vehicle body, and the connecting block is provided with an opening configured to hang and fix the box body.

Further, the bottom of the box body is exposed.

Further, the box body is provided with a mounting bar configured to be fixed to the bottom plate of the vehicle body, the mounting bar is provided at a bottom portion of a lateral side of the box body and extends through the box body in a width direction of the vehicle body, and the mounting bar has an "四"-shaped section, and the bottom plate of the vehicle body is fixed in an opening of the "四" shape of the "四"-shaped mounting bar.

Further, a minimum clearance between energized parts of the individual electric equipment in the equipment box and between a wall of the box body and the energized parts ranges from 310 mm to 320 mm.

Further, the main framework is provided with a top plate, a main side plate, a rear side plate, a metal-passing-cylinder mounting plate, and two end plates respectively at two ends, the rear side plate includes a side top plate and a side bottom plate; and the top plate and the main side plate are fixed by welding after being insertedly connected, and/or, the top plate and the side top plate are fixed by welding after being insertedly connected, and/or, the side top plate and the side bottom plate are fixed by welding after being insertedly connected.

Further, a connection position of the top plate and the main side plate, and/or a connection position of the top plate and the side top plate, and/or a connection position of the side top plate and the side bottom plate is configured as a misalignment structure for facilitating welding.

Further, the end frames and the connecting frame are each a hollow profile, and the hollow profile is provided with a flange for facilitating fixing the hollow profile to the end plate, the side top plate, or the side bottom plate by welding.

In summary, the high voltage equipment box for rail vehicles according to the present application is provided with the avoidance openings obliquely arranged at the bottoms of two ends of the box body, which not only allows the size of the box body to be increased significantly to meet the clearance requirement for equipment in the box, but also provides the mounting bases for the skirt plates. The top of the box body extends to the position above the bottom beams of the vehicle body, and the bottom of the box body also serves as a part of the bottom plate, which further increases the size of the box body. The fixed connections between the box body and the skirt plates of the vehicle as well as between the bottom plate of the vehicle body and the box body ensure the sealing performance of the equipment compartment beneath the vehicle, and improves cleanness inside the equipment compartment, and improves the capability of the vehicle withstanding fierce sand wind. The provision of the cable clamp and the filter enhances the sealing performance of the equipment box itself. The arrangement of the main framework and the plates of the box body effectively reduces the weight of the equipment box and improves the strength of the equipment box.

REFERENCE NUMERALS IN FIGS. 1 TO 20

Figure 1:
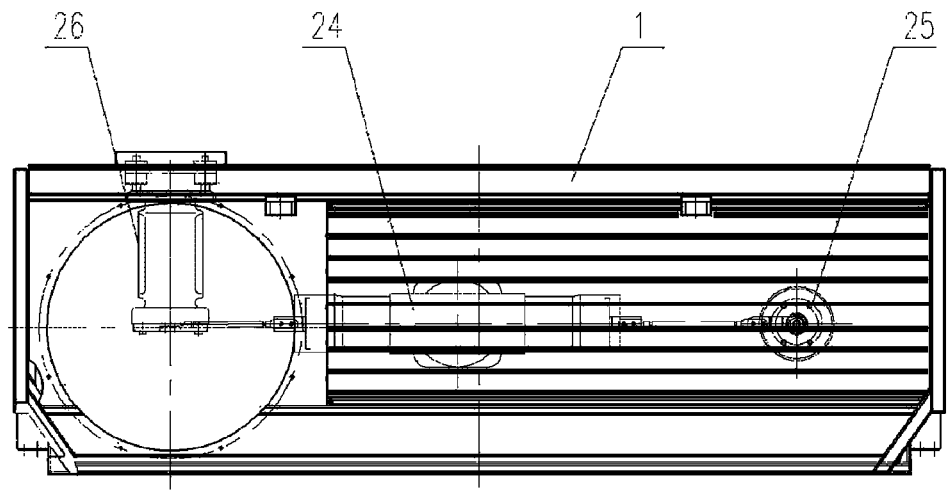
FIG. 1 is a structural schematic view of the present application.

| 1 | box body, | 2 | main framework, |
|---|---|---|---|
| 3 | bottom frame, | 4 | top frame, |
| 5 | end frame, | 6 | connecting frame, |
| 7 | top plate, | 8 | main side plate, |
| 9 | side top plate, | 10 | side bottom plate, |
| 11 | metal-passing-cylinder mounting plate, | 12 | end plate, |
| 13 | flange, | 14 | transition angle, |
| 15 | maintenance cover, | 16 | locking device, |
| 17 | lightning-arrester mounting port, | 18 | metal-passing-cylinder mounting port, |
| 19 | filter mounting port, | 20 | vacuum-circuit-breaker mounting port, |
| 21 | locking-device mounting port, | 22 | cable-connector mounting port, |
| 23 | cable-clamp mounting port, | 24 | vacuum circuit breaker, |
| 25 | cable connector, | 26 | lightning arrester, |
| 27 | metal passing cylinder, | 28 | connecting wire, |
| 29 | cable clamp, | 29a | fixed mounting block, |
| 29b | movable mounting block, | 29c | mounting hole, |
| 30 | filter, | 31 | skirt plate, |
| 32 | bottom beam of vehicle body, | 33 | bottom plate of vehicle body, |
| 34 | skirt plate mounting base, | 35 | hanger, |
| 35a | connecting block, | 36 | mounting bar, and |
| 36a | protruding structure. | | |

DETAILED DESCRIPTION

The present application is further described in detail hereinafter in conjunction with drawings and embodiments.

As shown in FIGS. 1 to 5, a high voltage equipment box for rail vehicles is provided, which is configured to be arranged in an equipment compartment mounted beneath a rail vehicle, and is configured to mount power receiving equipment.

As shown in FIGS. 11 to 14, the equipment box includes a box body 1. The box body 1 is in the shape of a rectangular parallelepiped and includes a main framework 2, and a top plate 7, a main side plate 8, a rear side plate, a metal-passing-cylinder mounting plate 11 and two end plates 12 respectively at two ends, which are all arranged on the main framework 2. The rear side plate includes a side top plate 9 and a side bottom plate 10. The main framework 2 includes a bottom frame 3, a top frame 4, and two end frames 5 respectively at the two ends. Each of the end frames 5 is in the shape of a square, each of the end plates 12 is welded to the respective end frame 5, and a connecting frame 6 is provided at the bottom of the end frame 5 and is fixed to the bottom frame 3, and the connecting frame 6 is obliquely arranged. One of the end frames 5 is fixedly connected to the other one of the end frames 5 via the top frame 4 at the top of the end frames 5. The top frame 4 includes two transverse beams extending through two ends of the box body and arranged at positions of two corners at the top of the square shape of the end frame 5, which can increase the connection strength.

Figure 16:
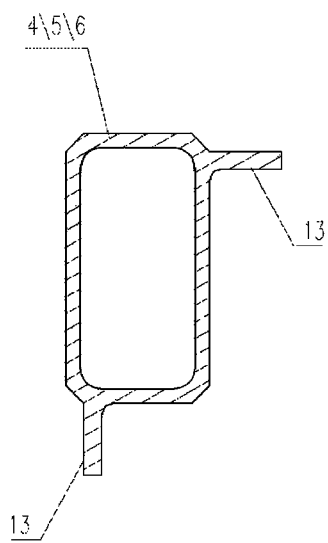
FIG. 16 is a schematic view of a hollow profile.

As shown in FIG. 16, the end frames 5, the top frame 4 and the connecting frames 6 are all embodied as hollow profiles, to reduce self-weight and improve strength. A flange 13 is provided on each of the hollow profiles, and the provision of the flange 13 is to facilitate welding the respective hollow profile to the end plate 12, the side top plate 9 or the side bottom plate 10, to improve the welding strength. The direction in which the respective flange 13 is arranged is the same as the direction in which the end plate 12, the side top plate 9 or the side bottom plate 10 is arranged. A certain height difference is formed between the position where the flange 13 is arranged and a surface of the hollow profile. The end plate 12, the side top plate 9 or the side bottom plate 10 fits closely against a surface on one side of the respective flange 13, and is fixed to the respective flange 13 by welding, to allow the end plate 12, the side top plate 9 or the side bottom plate 10 to be flush with the surface of the hollow profile after being fixed by welding.

Figure 17:
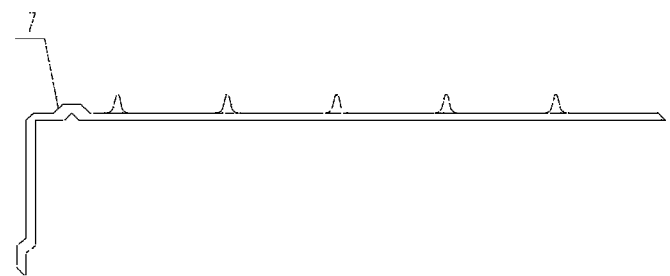
FIG. 17 is a schematic view showing a section of a top plate.
Figure 18:
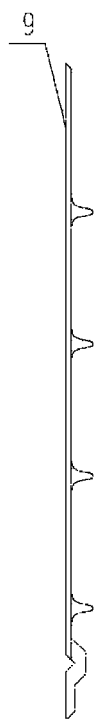
FIG. 18 is a schematic view showing a section of a side top plate.

As shown in FIGS. 17 and 18, at the top of the box body 1, i.e., above the top frame 4 of the main framework 2, the top plate 7 is fixed by welding. The top plate 7 is formed by splicing multiple plates, and the multiple plates are fixed together by welding, which facilitates manufacturing, reduces the self weight and improves the strength. The top plate has an L-shaped section, which bends downward by a certain distance from a lateral side of the box body 1, and is insertedly connected to the main side plate 8 and the side top plate 9 at two sides of the box body 1 and then is fixed to the main side plate 8 and the side top plate 9 by welding. At a connection position where the top plate 7 is connected to the main side plate 8 or the side top plate 9, a misalignment is formed between the top plate 7 and the main side plate 8 or between the top plate 7 and the side top plate 9, to facilitate the welding after the insertion connection, and the insertion connection may facilitate improving the connection strength.

The main side plate 8 and the rear side plate are respectively fixed to two sides of the box body 1 by welding. The main side plate 8 is an integrated piece, its four edges are respectively fixed to the top plate 7, the end frames 5, the connecting frames 6 and the bottom frame 3 by welding. The rear side plate includes the side top plate 9 and the side bottom plate 10. The side top plate 9 is formed by splicing and welding multiple plates. The bottom of the side top plate 9 is insertedly connected to the side bottom plate 10 and then fixed to the side bottom plate 10 by welding. At a connection position where the side top plate 9 and the side bottom plate 10 are connected, a misalignment is formed between the side top plate 9 and the side bottom plate 10, to facilitate fixing by welding after the insertion connection, and the insertion connection facilitates improving the connection strength. The metal-passing-cylinder mounting plate 11 is fixed to the side top plate 9 and the side bottom plate 10 by welding. The metal-passing-cylinder mounting plate 11, the side top plate 9 and the side bottom plate 10 which are integrally fixed by welding are fixed to the top plate 7, the end frames 5, the connecting frames 6 and the bottom frame 3 by welding.

Figure 19:
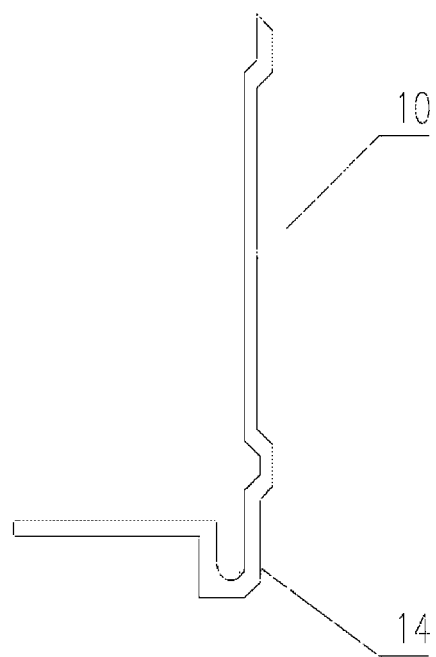
FIG. 19 is a schematic view showing a section of a side bottom plate.

As shown in FIG. 19, the bottom of the side bottom plate 10 bends inward from the bottom of the box body 1, to facilitate welding the side bottom plate 10 to the bottom frame 3. The bottom of the side bottom plate 10 is provided with a U-shaped transition angle 14, which facilitates reducing the weight of the box body 1 and improving the strength of the box body 1.

Figure 3:
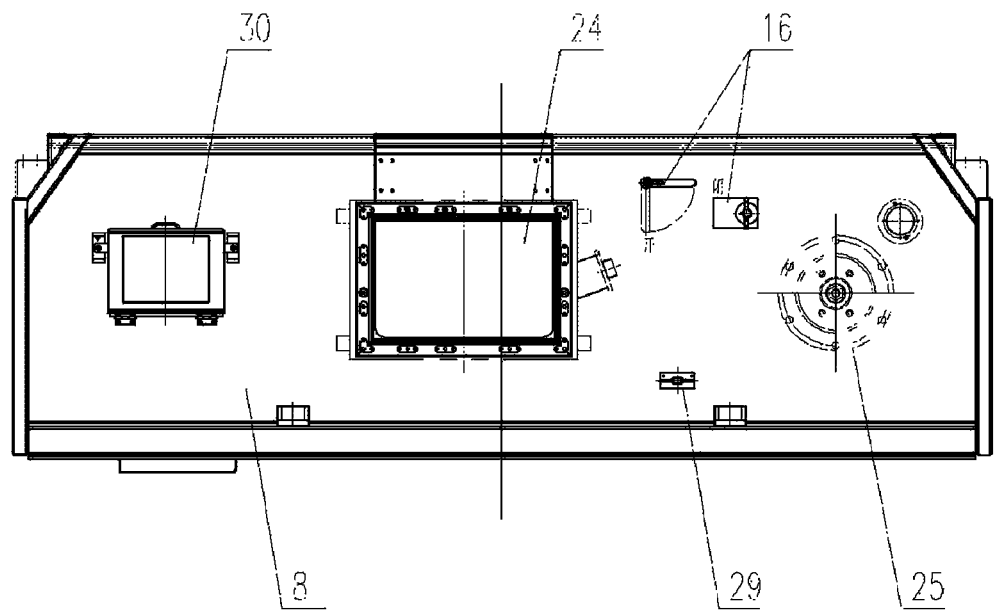
FIG. 3 is a rear view of FIG. 1.
Figure 4:
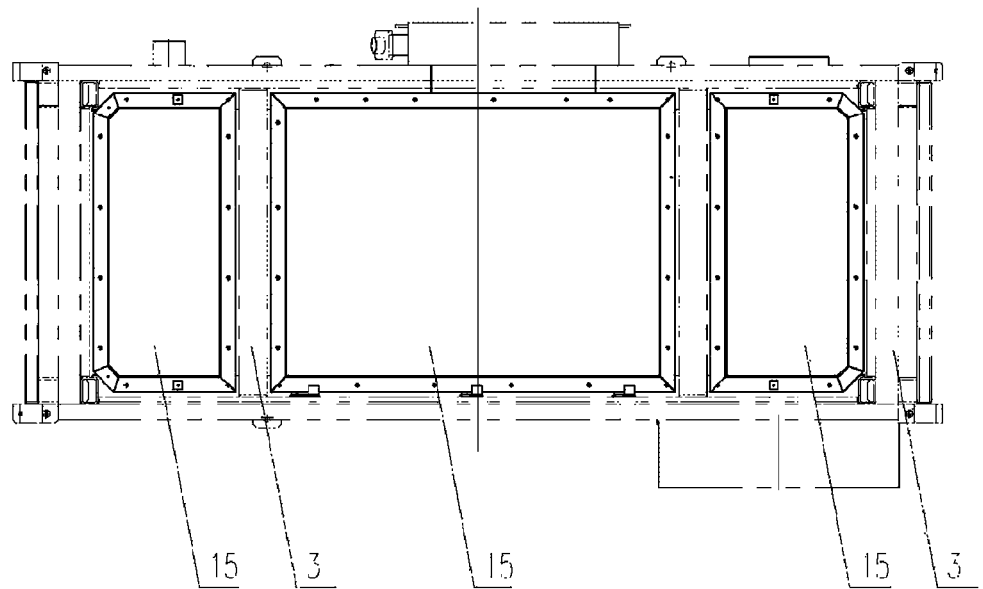
FIG. 4 is a bottom view of FIG. 1.
Figure 5:
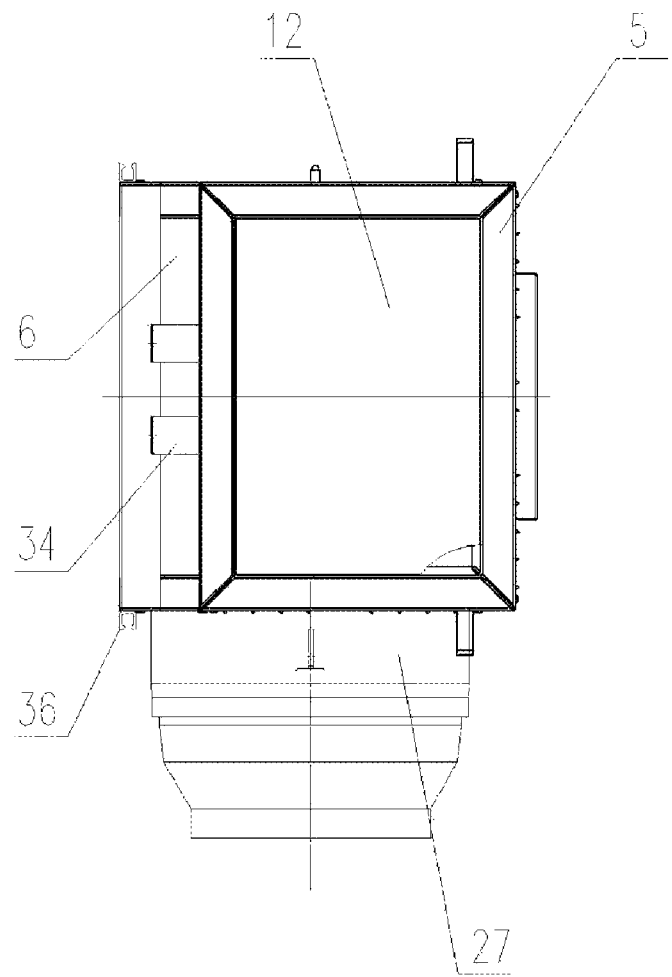
FIG. 5 is a left view of FIG. 1.

As shown in FIGS. 3 and 4, the bottom of the box body 1 is the bottom frame 3 of the main framework 2. The bottom frame 3 is provided with three maintenance cover mounting holes, and three maintenance covers 15 are fixed to the bottom frame 3 and are used for maintenance of equipment in the box. Locking devices 16 are further provided to lock the maintenance covers 15. In performing operation or maintenance, it must operate the locking devices 16 first, and then the maintenance covers 15 can be opened, thus ensuring security.

The top plate 7, the main side plate 8, the rear side plate, the metal-passing-cylinder mounting plate 11 and the end plates 12 at two ends each employ aluminum alloy, to meet the requirement of withstanding severe cold. The top plate 7 and the rear side plate are each embodied as a wave-shaped profile structure, to reduce the weight of the box body 1 and improve the strength of the box body 1.

Figure 11:
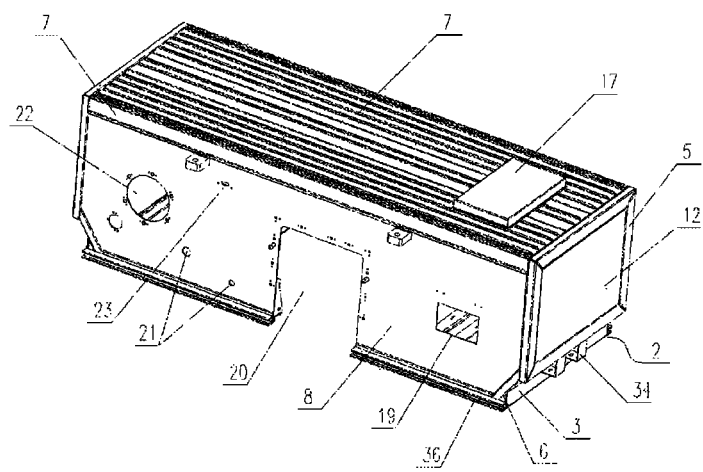
FIG. 11 is a perspective view showing the box body viewed from a main side plate side.
Figure 12:
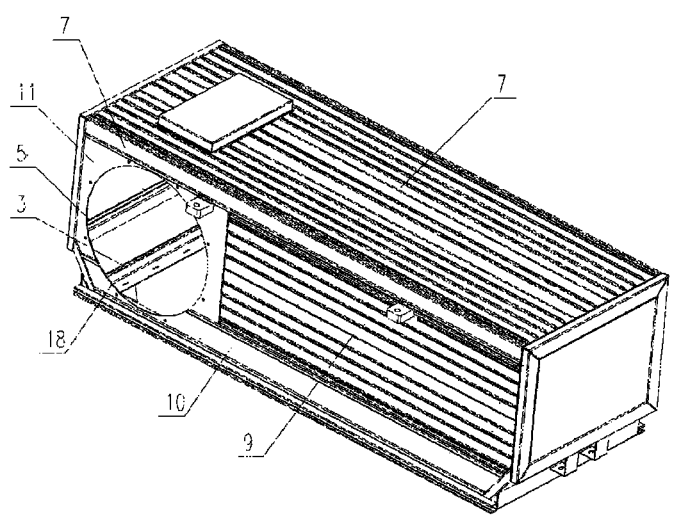
FIG. 12 is a perspective view showing the box body viewed from a rear side plate side.
Figure 13:
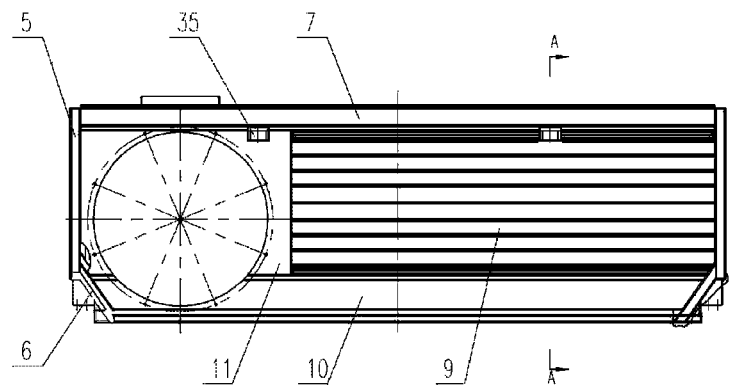
FIG. 13 is a schematic plane view of the box body.

As shown in FIGS. 11 and 12, a lightning-arrester mounting port 17 is provided in the top plate 7, and a metal-passing-cylinder mounting port 18 is provided in the metal-passing-cylinder mounting plate 11. A filter mounting port 19, a vacuum-circuit-breaker mounting port 20, a locking-device mounting port 21, a cable-connector mounting port 22 and a cable-clamp mounting port 23 are provided in the main side plate 8.

Figure 2:
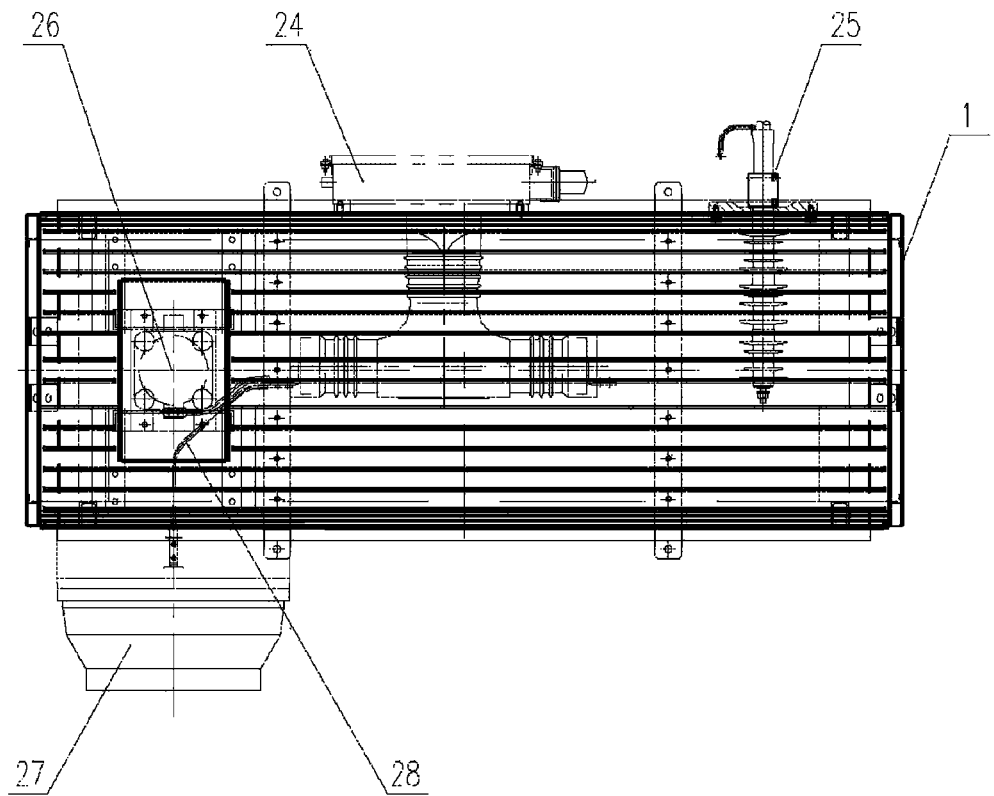
FIG. 2 is a top view of FIG. 1.

As shown in FIGS. 1 to 3, the box body 1 is embodied as a sealed structure, and a vacuum circuit breaker 24, a cable connector 25 and a lightning arrester 26 are arranged in the box body 1. The lightning arrester 26 is fixed to the top plate 7 via the lightning-arrester mounting port 17, and the vacuum circuit breaker 24 and the cable connector 25 are fixed to the main side plate 8 via the vacuum-circuit-breaker mounting port 20 and the cable-connector mounting port 22 respectively. The vacuum circuit breaker 24 and the cable connector 25 are connected to each other by a connecting wire 28, and the vacuum circuit breaker 24 and the lightning arrester 26 are connected to each other by a connecting wire 28. The box body 1 is provided with a metal-passing-cylinder 27 to be connected to a traction transformer (not shown). The vacuum circuit breaker 24 and the traction transformer are connected by a connecting wire 28 passing through the metal passing cylinder 27. The metal passing cylinder 27 is embodied as a telescopic structure, and is fixed to the metal-passing-cylinder mounting plate 11 via the metal-passing-cylinder mounting port 18, and a sealing strip is provided inside to ensure the sealing performance.

As shown in FIG. 3, the box body 1 is provided with a cable clamp 29 and a filter 30, and the cable clamp 29 and the filter 30 are arranged on the main side plate 8 via the cable-clamp mounting port 23 and the filter mounting port 19 respectively. The cable clamp 29 is configured to seal cables entered into the box body 1, and the filter 30 is configured to exchange the pressure in the box body 1 with the ambient atmospheric pressure to accommodate the pressure variation when the vehicle passes through a tunnel.

Figure 15:
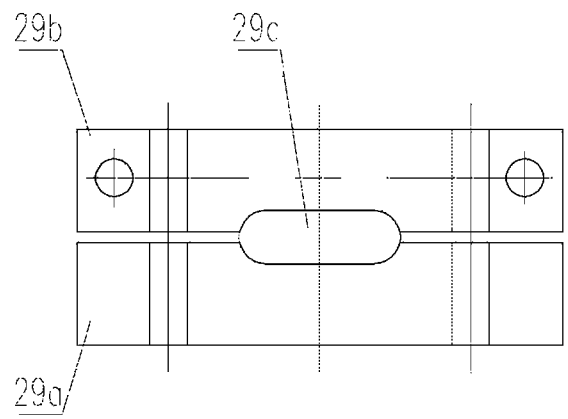
FIG. 15 is a schematic view of a cable clamp.

As shown in FIG. 15, the cable clamp 29 includes a fixed mounting block 29a welded onto the box body 1 and a movable mounting block 29b fixed to the box body 1 by bolting. The fixed mounting block 29a and the movable mounting block 29b are fixed to each other by bolting. The fixed mounting block 29a and the movable mounting block 29b are each provided with a half of an elliptic mounting hole 29c, and cables enter into the box body 1 via the elliptical mounting hole 29c. After the fixed mounting block 29a and the movable mounting block 29b fit against each other and are connected by bolting, the fixed mounting block 29a and the movable mounting block 29b clamp the cables in the elliptical mounting hole 29c, to seal the cables.

For ensuring the sealing performance of the box body 1, the vacuum circuit breaker 24, the cable connector 25, the metal passing cylinder 27, the filter 30 and the maintenance covers 15 are each sealed by a rubber gasket.

The box body 1 has an increased size, to allow a minimum clearance between energized parts of the vacuum circuit breaker 24, the cable connector 25 and the lightning arrester 26 and between a wall of the box body 1 and the energized parts to be in a range from 310 mm to 320 mm, inclusive, and preferably the minimum clearance is 315 mm in this embodiment, to meet the requirement of overvoltage level OV4 (GB/T21413.1).

Figure 6:
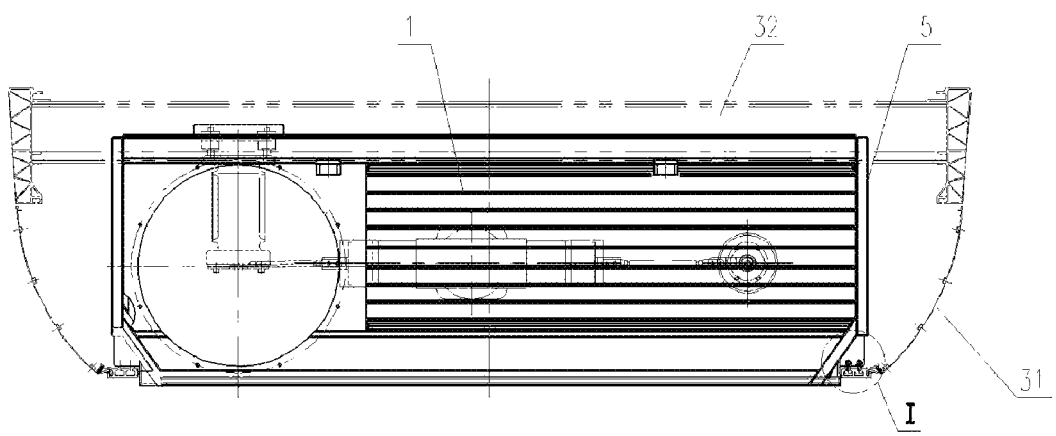
FIG. 6 is a schematic view showing the connection between an equipment box and a skirt plate.
Figure 7:
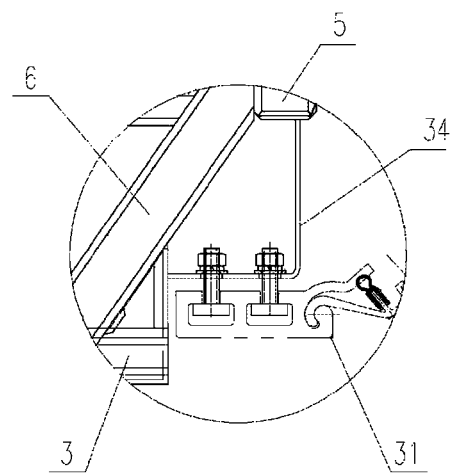
FIG. 7 is an enlarged view of part I of FIG. 6.

As shown in FIGS. 6 and 7, two ends of the box body 1 in a width direction of the vehicle, i.e., the ends where the end plates 12 are located, extend to the skirt plates 31 respectively. The bottom of each of the skirt plates 31 of the vehicle is fixed to the box body 1. The end frames 5 of the main framework 2 are perpendicular to the bottom frame 3 of the main framework 2, and the oblique connecting frames 6 are arranged between the end frames 5 and the bottom frame 3. The connecting frames 6 are titled by 35 degrees, to allow avoidance gaps to be formed at the bottoms of two ends, close to the skirt plates 31, of the box body 1.

Two skirt plate mounting bases 34 are provided at the positions of the avoidance gaps where the connecting frames 6 are located. Each of the skirt plate mounting bases 34 is a connecting sheet having two sides, and is L-shaped. The L-shaped skirt plate mounting base has one end connected to the bottom of the respective end frame 5 and another end connected to a respective end of the bottom frame 3. Two openings are provided in the side, fixed to the bottom frame 3, of the skirt plate mounting base 34. Two bolts are nested in the bottom of the skirt plate 31, and the two bolts respectively pass through the two openings and are fixedly hanged on the skirt plate mounting base 34 by nuts.

With the avoidance gaps formed by the oblique arrangement of the connecting frames 6, the bottoms of the skirt plates 31 may be hanged and fixed at the avoidance gaps, thus enabling the box body 1 to avoid the skirt plates when the size of the box body 1 is increased in the width direction of the vehicle. The box body 1 with the increased size enables the electric equipment in the box to meet the clearance requirement. The fixed connection between the skirt plates 31 of the vehicle and the box body 1 further ensures the sealing performance of the equipment compartment beneath the vehicle, improves the cleanness inside the equipment compartment, and improves the capability of the vehicle withstanding fierce sand wind.

Figure 8:
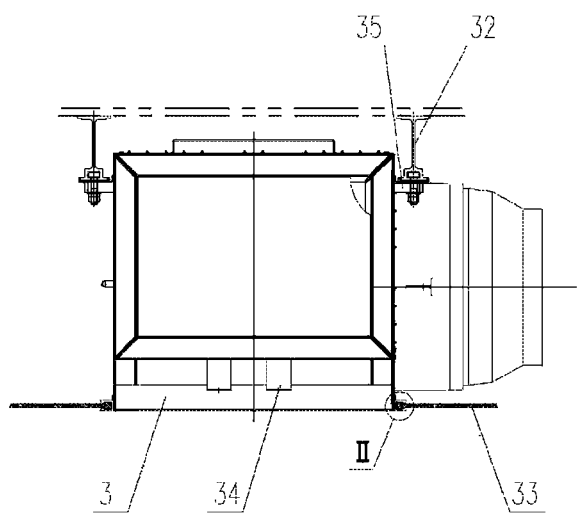
FIG. 8 is a schematic view showing the connection between the equipment box and a bottom plate of a vehicle body.
Figure 9:
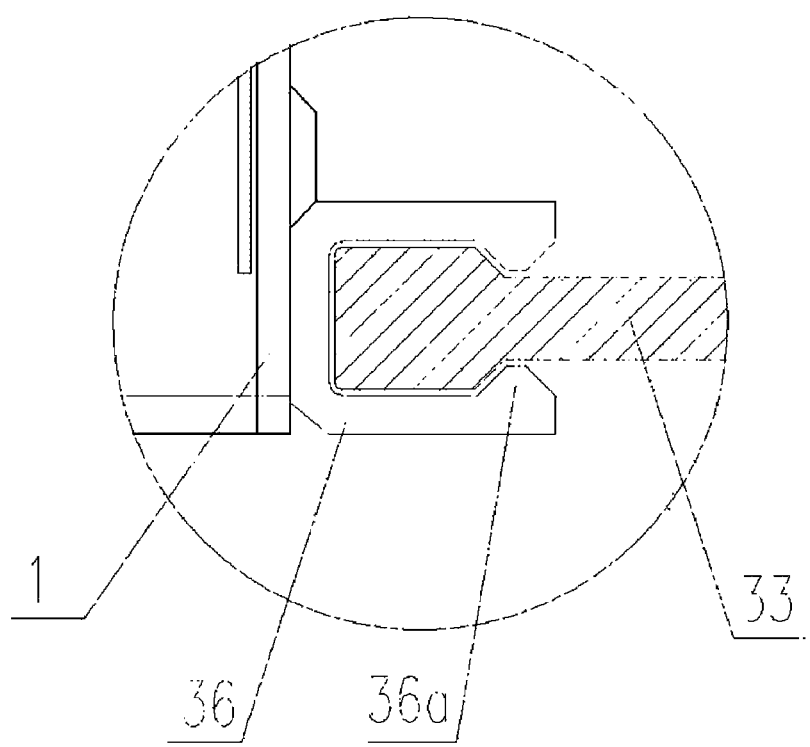
FIG. 9 is an enlarged view of part II of FIG. 8.
Figure 10:
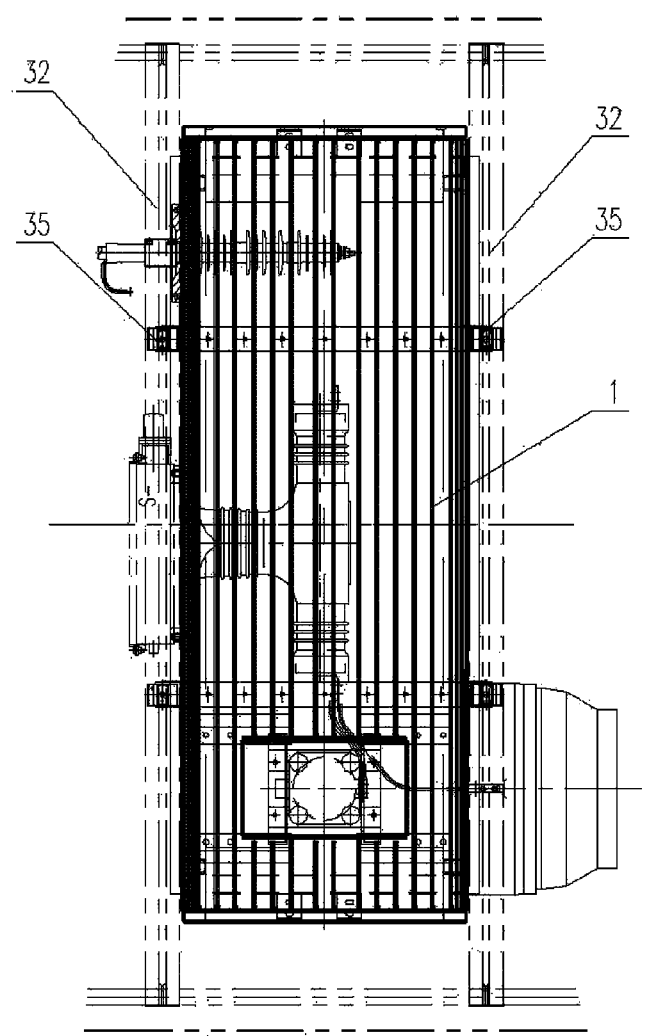
FIG. 10 is a schematic view showing the connection between the equipment box and a bottom beam of the vehicle body.
Figure 14:
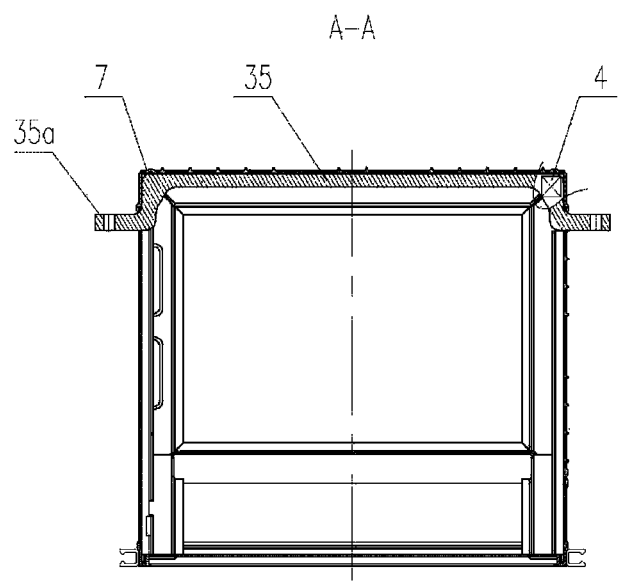
FIG. 14 is a sectional view of FIG. 13 taken along line A-A.
Figure 20:
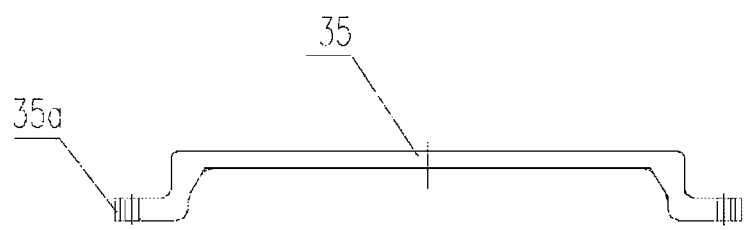
FIG. 20 is a schematic view of a hanger.

As shown in FIGS. 8 to 10, two sides of the box body 1 in a length direction of the vehicle (i.e., a width direction of the box body) are flush with two bottom beams 32 of the vehicle body of the vehicle, which are adjacent to the box body 1, and the top of the box body 1 extends to the position above the bottom beams 32 of the vehicle body. As shown in FIGS. 14 and 20, a hanger 35 is provided on the box body 1, and the hanger 35 is configured to be fixed to the bottom beams 32 of the vehicle body, to hang and fix the box body 1 to the bottom beams 32 of the vehicle body. The hanger 35 is in an "⌐⌐" shape. The hanger 35 is arranged along the length direction of the vehicle, and extends through the two sides of the box body 1. The hanger 35 is fixed to the main framework 2 by welding. The hanger 35 extends downward by a certain distance at two lateral sides in the width direction of the box body 1, and in this embodiment, the extending distance is 93 mm. A bottom end of each of the extending portions is provided with a connecting block 35a protruding outwards to form a mounting base structure, and an opening for hanging the box body 1 is provided in the connecting block 35a. A lateral surface at one side of the connecting block 35a fits closely against a bottom surface of the respective bottom beam 32 of the vehicle body and is fixed to the bottom beam 32 by bolting. In this embodiment, two hangers 35 are provided, and due to the provision of the hangers 35, the top frame 4 is divided into three segments to be fixed to the hanger 35 by welding.

Since the connecting blocks 35a at two ends of the hanger 35 fit closely against bottom surfaces of the bottom beams 32 of the vehicle body, the structure of the box body 1, located above a horizontal plane where the connecting blocks 35a are located, extends to the position above the bottom beams 32 of the vehicle body. The distance by which the hanger 35 extends downwards at the two lateral sides in the width direction of the box body 1 is just the length of the portion of the top of the box body 1 that is above the bottom beams 32 of the vehicle body, and in this embodiment, the length is 93 mm. With the arrangement of the hangers 35, the size of the box body 1 can be increased without being constrained by the bottom beams 32 of the vehicle body and under the premise of not making improvement to the bottom beams 32 of the vehicle body.

The box body 1 is widened between the two lateral sides in the length direction of the vehicle to be flush with the two bottom beams 32 of the vehicle body adjacent to the box body 1. With the improvement obtained by the hangers 35, the box body 1 extends to the position above the bottom beams 32 of the vehicle body in a height direction, and the size of the box body 1 is significantly increased, thus meeting the clearance requirement for the electric equipment in the box. Since the connecting points, where the box body 1 and the bottom beams 32 of the vehicle body are connected, are on the lateral sides of the box body 1, and if only providing separate hanger structures on the lateral sides, the structural strength will not be sufficient, and thus the hanger 35 is embodied as the structure extending through the two lateral sides of the box body 1, thus meeting the strength requirement.

The bottom of the box body 1 extends downwards, and is exposed out of a bottom plate 33 of the vehicle body. In this embodiment, the bottom of the box body 1 is flush with the bottom plate 33 of the vehicle body, and the bottom of the box body 1 also serves as a part of the bottom plate 33 of the vehicle body. With the bottom of the box body 1 extending downward and serving as a part of the bottom plate 33 of the vehicle body, it is possible to increase the size of the box body 1 without making improvement to the bottom plate 33 of the vehicle body, and the box body 1 with the increased size enables the electric equipment in the box body 1 to meet the clearance requirement.

As shown in FIG. 9, the box body 1 is provided with a mounting bar 36, and the mounting bar 36 is configured to be fixed to the bottom plate 33 of the vehicle body. The mounting bar 36 extends through the box body 1 in the width direction of the vehicle (i.e., the length direction of the box body), and is arranged at a bottom portion of each of two lateral sides of the box body 1. The mounting bar 36 is arranged at a height allowing the mounting bar 36 to be flush with the bottom plate 33 of the vehicle body. The mounting bar 36 has a section in a "凹" shape, and an opening of the "凹" shaped section faces towards the side of the bottom plate 33 of the vehicle body, and the bottom plate 33 of the vehicle body is insertedly connected and fixed into the opening of the "凹" shape. An upwardly-downwardly protruding structure 36a is provided in the opening of the "凹" shape and are configured to retain the bottom plate of the vehicle body, and a portion of the bottom plate 33 of the vehicle body that is inserted in to the opening has a shape matching with the shape of the upwardly-downwardly protruding structure 36a, to prevent the bottom plate 33 of the vehicle body, after being inserted into the opening, from being disengaged from the opening of the "凹" shape due to vehicle vibration. The fixed connection between the bottom plate 33 of the vehicle body and the box body 1 ensures the sealing performance of the equipment compartment beneath the vehicle, and improves cleanness in the equipment compartment, and improves the capability of the vehicle withstanding fierce sand wind.

In summary, the high voltage equipment box for rail vehicles according to the present application is provided with the avoidance openings obliquely arranged at the bottoms of two ends of the box body, which not only allows the size of the box body 1 to be increased significantly to meet the clearance requirement for equipment in the box, but also provides the mounting bases for the skirt plates 31. The top of the box body 1 extends to the position above the bottom beams 32 of the vehicle body, and the two sides of the box body 1 in the length direction of the vehicle are flush with the two bottom beams 32 of the vehicle body which are adjacent to the box body 1, and the bottom of the box body also serves as a part of the bottom plate 33 of the vehicle body, which further increases the size of the box body 1, and meets the clearance requirement for the equipment in the box. The fixed connections between the box body 1 and the skirt plates 31 of the vehicle as well as between the bottom plate 33 of the vehicle body and the box body 1 ensure the sealing performance of the equipment compartment beneath the vehicle, and improves cleanness inside the equipment compartment, and improves the capability of the vehicle withstanding fierce sand wind. The plates of the box body 1 all employ an aluminum alloy material, to meet the requirement for withstanding severe cold. The equipment box is embodied as a sealed structure, and the arrangement of its main framework 2 and all the plates effectively reduces the weight of the equipment box and improves the strength of the equipment box when the size of the box body 1 is increased. The top plate 7 and the rear side plate are embodied as wave-shaped profile structures, which further reduces the weight of the equipment box and improves the strength of the equipment box. The provision of the cable clamp 29 further increases the sealing performance of the equipment box itself, and the provision of the filter 30 is to exchange the pressure in the box body with the ambient atmospheric pressure to accommodate the pressure variation when the vehicle passes through a tunnel. The minimum clearance between energized parts of the vacuum circuit breaker 24, the cable connector 25 and the lightning arrester 26 as well as between the wall of the box body 1 and the energized parts is 315 mm, thus allowing the equipment box to meet the requirement of high altitude operation.

Based on the above description, similar technical solutions can be derived with reference to the content of solutions provided in the drawings. However, any simple changes, equivalent variations and modifications made to the above embodiments according to the technical contents of the present application, without departing from the content of the technical solutions of the present application, are all deemed to fall in the scope of the technical solutions of the present application.

What is claimed is:

1. A high voltage equipment box for a rail vehicle, comprising:
   a box body; and
   electric equipment arranged in the box body; wherein,
   two ends of the box body in a width direction of the vehicle extend to respective skirt plates, and an avoidance gap is provided at a bottom of each of the two ends of the box body; and
   a bottom of each of the skirt plates is fixed at the respective avoidance gap, a top of the box body extends to a position above a bottom beam of a vehicle body, and a bottom of the box body is flush with a bottom plate of the vehicle body and forms a part of the bottom plate of the vehicle body.

2. The high voltage equipment box for the rail vehicle according to claim 1, wherein the box body comprises a main framework, and the main framework comprises a bottom frame and two end frames arranged at two ends of the bottom frame respectively, and the bottom frame is fixed to each of the end frames by a respective connecting frame obliquely arranged.

3. The high voltage equipment box for the rail vehicle according to claim 2, wherein a skirt plate mounting base is provided at a position where the connecting frame is located, the skirt plate mounting base is in an L shape, and the L-shaped skirt plate mounting base has one end connected to a bottom of the respective end frame and another end connected to the bottom frame, and a bottom of the skirt plate is fixed to the skirt plate mounting base.

4. The high voltage equipment box for the rail vehicle according to claim 3, wherein a minimum clearance between energized parts of the individual electric equipment in the equipment box and between a wall of the box body and the energized parts ranges from 310 mm to 320 mm.

5. The high voltage equipment box for the rail vehicle according to claim 2, wherein the main framework is provided with a top plate, a main side plate, a rear side plate, a metal-passing-cylinder mounting plate, and two end plates respectively at two ends, the rear side plate comprises a side top plate and a side bottom plate; and the top plate and the main side plate are fixed by welding after being insertedly connected, and/or, the top plate and the side top plate are fixed by welding after being insertedly connected, and/or, the side top plate and the side bottom plate are fixed by welding after being insertedly connected.

6. The high voltage equipment box for the rail vehicle according to claim 5, wherein a connection position of the top plate and the main side plate, and/or a connection position of the top plate and the side top plate, and/or a connection position of the side top plate and the side bottom plate is configured as a misalignment structure for facilitating welding.

7. The high voltage equipment box for the rail vehicle according to claim 5, wherein the end frames and the connecting frame are each a hollow profile, and the hollow profile is provided with a flange for facilitating fixing the hollow profile to the end plate, the side top plate, or the side bottom plate by welding.

8. The high voltage equipment box for the rail vehicle according to claim 2, wherein a minimum clearance between energized parts of the individual electric equipment in the equipment box and between a wall of the box body and the energized parts ranges from 310 mm to 320 mm.

9. The high voltage equipment box for the rail vehicle according to claim 1, wherein two sides of the box body in a length direction of the vehicle are flush with two bottom beams of the vehicle body which are adjacent to the box body.

10. The high voltage equipment box for the rail vehicle according to claim 9, wherein a minimum clearance between energized parts of the individual electric equipment in the equipment box and between a wall of the box body and the energized parts ranges from 310 mm to 320 mm.

11. The high voltage equipment box for the rail vehicle according to claim 1, wherein the box body is provided with a hanger, the hanger is arranged in the length direction of the vehicle and extends through the two sides of the box body, two ends of the hanger extend downward and are respectively provided with connecting blocks protruding outwards, one lateral surface of each of the connecting blocks fits closely against a bottom surface of the respective bottom beam of the vehicle body, and the connecting block is provided with an opening configured to hang and fix the box body.

12. The high voltage equipment box for the rail vehicle according to claim 11, wherein a minimum clearance between energized parts of the individual electric equipment in the equipment box and between a wall of the box body and the energized parts ranges from 310 mm to 320 mm.

13. The high voltage equipment box for the rail vehicle according to claim 1, wherein the bottom of the box body is exposed.

14. The high voltage equipment box for the rail vehicle according to claim 13, wherein a minimum clearance between energized parts of the individual electric equipment in the equipment box and between a wall of the box body and the energized parts ranges from 310 mm to 320 mm.

15. The high voltage equipment box for the rail vehicle according to claim 1, wherein the box body is provided with a mounting bar configured to be fixed to the bottom plate of the vehicle body, the mounting bar is provided at a bottom portion of a lateral side of the box body and extends through the box body in a width direction of the vehicle body, and the mounting bar has an "凹"-shaped section, and the bottom plate of the vehicle body is fixed in an opening of the "凹" shape of the "凹"-shaped mounting bar.

16. The high voltage equipment box for the rail vehicle according to claim 15, wherein a minimum clearance between energized parts of the individual electric equipment in the equipment box and between a wall of the box body and the energized parts ranges from 310 mm to 320 mm.

17. The high voltage equipment box for the rail vehicle according to claim 1, wherein a minimum clearance between energized parts of the individual electric equipment in the equipment box and between a wall of the box body and the energized parts ranges from 310 mm to 320 mm.

* * * * *